United States Patent
Schrodi

(10) Patent No.: US 8,199,647 B2
(45) Date of Patent: Jun. 12, 2012

(54) DATA TRANSMISSION IN A PACKET-ORIENTED COMMUNICATION NETWORK

(75) Inventor: Karl Schrodi, Geretsried (DE)

(73) Assignee: Nokia Siemens Networks GmbH & Co. KG, Munich (DE)

(*) Notice: Subject to any disclaimer, the term of this patent is extended or adjusted under 35 U.S.C. 154(b) by 922 days.

(21) Appl. No.: 10/490,580

(22) PCT Filed: Sep. 20, 2002

(86) PCT No.: PCT/DE02/03584
§ 371 (c)(1),
(2), (4) Date: Mar. 19, 2004

(87) PCT Pub. No.: WO03/026341
PCT Pub. Date: Mar. 27, 2003

(65) Prior Publication Data
US 2005/0007955 A1    Jan. 13, 2005

(30) Foreign Application Priority Data

Sep. 20, 2001 (DE) .................. 101 46 349
Oct. 4, 2001 (DE) .................. 101 48 893
Dec. 14, 2001 (DE) .................. 101 61 508
Dec. 14, 2001 (DE) .................. 101 61 546
Dec. 14, 2001 (DE) .................. 101 61 547

(51) Int. Cl.
*H04J 3/14* (2006.01)
*H04L 12/28* (2006.01)

(52) U.S. Cl. .................. 370/231; 370/235; 370/401

(58) Field of Classification Search .................. 370/230, 370/235, 401
See application file for complete search history.

(56) References Cited

U.S. PATENT DOCUMENTS

| | | | |
|---|---|---|---|
| 5,953,337 A | 9/1999 | Almay | |
| 6,023,456 A * | 2/2000 | Chapman et al. | 370/252 |
| 6,122,743 A * | 9/2000 | Shaffer et al. | 726/3 |
| 6,269,079 B1 * | 7/2001 | Marin et al. | 370/230 |
| 6,389,014 B1 | 5/2002 | Song | |
| 6,693,909 B1 * | 2/2004 | Mo et al. | 370/392 |
| 6,778,498 B2 * | 8/2004 | McDysan | 370/231 |
| 7,009,976 B1 * | 3/2006 | Michelson et al. | 370/394 |

(Continued)

FOREIGN PATENT DOCUMENTS

CN    1142298 A    2/1997

(Continued)

*Primary Examiner* — Marcus R Smith
(74) *Attorney, Agent, or Firm* — Laurence A. Greenberg; Werner H. Stemer; Ralph E. Locher

(57) ABSTRACT

According to the present invention, a large scale traffic distribution is carried out in a packet-oriented communication network. The distribution results, in a simple, practical and inexpensive way, for all the services and applications which reliably and efficiently preserve their specific quality of service requirements, in a highly balanced quality of service with best effort character. Preferably, there is in the traffic at least a priority class traffic whereof the traffic concerned is transmitted in distributed manner and in packets with strict priority in the communication network. The observance of specific quality of service requirements is monitored at least for the priority traffic. Classification in the priority class traffic enables to provide an adequate quality of service, even for real-time services and applications.

9 Claims, 4 Drawing Sheets

U.S. PATENT DOCUMENTS

| | | | |
|---|---|---|---|
| 7,027,448 B2 * | 4/2006 | Feldmann et al. | 370/401 |
| 7,065,586 B2 * | 6/2006 | Ruttenberg et al. | 709/244 |
| 7,111,071 B1 * | 9/2006 | Hooper | 709/238 |
| 7,209,437 B1 * | 4/2007 | Hodgkinson et al. | 370/230 |
| 7,274,700 B2 * | 9/2007 | Jin et al. | 370/392 |
| 7,307,954 B1 * | 12/2007 | Strandberg et al. | 370/235 |

FOREIGN PATENT DOCUMENTS

| | | |
|---|---|---|
| DE | 199 23 245 A1 | 11/2000 |
| EP | 1 119 216 A1 | 7/2001 |
| EP | 1 133 112 A2 | 9/2001 |
| WO | 99/27686 | 6/1999 |

* cited by examiner

DATA TRANSMISSION IN A PACKET-ORIENTED COMMUNICATION NETWORK

CROSS REFERENCE TO RELATED APPLICATIONS

This application is the US National Stage of International Application No. PCT/DE02/03584, filed Sep. 20, 2002 and claims the benefit thereof. The International Application claims the benefits of German application No. 10146349.9 DE filed Sep. 20, 2001, German application No. 10148893.9 DE filed Oct. 4, 2001, German application No. 10161508.6 DE filed Dec. 14, 2001, German application No. 10161546.9 DE filed Dec. 14, 2001, German application No. 10161547.7 DE filed Dec. 14, 2001, all of the applications are incorporated by reference herein in their entirety.

FIELD OF INVENTION

The subject of the application is for example also applicable to the field of standardized networks for the reliable transport of digitally coded information for data, voice, audio/video and other services and applications in compliance with corresponding service-specific or application-specific quality-of-service requirements and extends to interactive real-time communication. Patent applications DE 10146349.9, DE 10161508.6, DE 10161546.9, DE 10161547.7 are also applicable to this same field. Their disclosure is made by reference to the content of the present description.

BACKGROUND OF INVENTION

In the past two main types of communication networks have evolved for transmitting information embedded in traffic streams: packet-oriented data networks and line-based voice networks. Their different quality-of-service (QoS) requirements are one aspect in which they differ from each other.

"Quality of Service" is defined differently depending on context and is therefore evaluated using different metrics. Known examples of metrics for measuring quality of service are the maximum number of information elements that can be transmitted (bandwidth), the number of information elements transmitted, the number of information elements not transmitted (loss rate), the—possibly mean—time delay during transmission ((transmission) delay), the—possibly mean—deviation from the otherwise standard interval between two information transmissions (delay jitter, interarrival jitter) or the number of information elements not permitted to be transmitted (blocking rate).

In multimedia networks services are also known as multimedia applications. A multimedia network is used here to describe a network in which a plurality of different services is provided. In a narrower sense it refers in particular to a broadband, service-integrated network (B-ISDN=Broadband Integrated Services Digital Network) in which the traffic streams resulting from use of the services can be transmitted by means of a standard, preferably packet-oriented transport mechanism. The term multimedia application thereby covers both services and normal telephony (also referred to as Voice over IP (VoIP) in packet-oriented IP networks, as well as services such as fax, telephone conference, video conference, Video on Demand (VoD) and so on.

Line-based (voice) networks are designed to transmit traffic streams in which continuously streaming (voice) information is embedded. In specialist circles these are also referred to as calls or sessions. Information is generally transmitted here with a high quality of service and security. For example for voice a minimum—e.g. <200 ms—delay is important without delay jitter, as voice requires a continuous information flow for playback in the receiving device. Information loss can therefore not be compensated for by retransmission of information not transmitted and generally results in the receiving device in an acoustically perceptible clicking. In specialist circles voice transmission is also generally referred to as a realtime (transmission) service.

A low blocking rate is achieved for example by appropriate dimensioning and planning of the voice networks. A small and largely constant delay or delay jitter is generally also achieved in the case of joint transmission of a plurality of traffic streams via a shared channel by using a static time division multiplex also referred to as TDM. Here the traffic streams are segmented in the transmitter into homogenous units of fixed length—also referred to as time slots—and transmitted temporally interleaved in each other. Assignment of the time slots to the respective traffic streams is indicated by their position within the channel. After joint transmission the time slots can be assigned to their associated traffic streams in the receiver and where necessary can also be reassembled into the original traffic streams. As a result the transmission capacity of the traffic streams is essentially not subject to any fluctuations during line-based transmission but is fixed at a predefined value (e.g. 64 kbps in modern ISDN telephone networks).

Packet-oriented (data) networks are designed to transmit traffic streams configured as packet streams, also referred to in specialist circles as data packet streams. It is generally not necessary to guarantee a high quality of service here. For example in the case of an email it is not necessary to have a minimum delay without delay jitter, as an email does not have to be played back in realtime at the receiver. More important here is that the email should be transmitted without error. Information loss is therefore generally compensated for by retransmission of information that was not transmitted or was transmitted incorrectly. The delay of an email therefore varies as a function of the frequency of retransmission. Delay jitter therefore also tends to be high. In specialist circles the transmission of data is therefore also referred to as a non-realtime service.

There is essentially no blocking rate in packet-oriented data networks. In principle all packets in all traffic streams are always transmitted. The traffic streams are however transmitted even when there is only moderate loading of a data network with significantly fluctuating time delays as the individual packets are generally transmitted in the sequence of their network access, i.e. the time delays increase, the more packets have to be transmitted by a data network. Joint transmission of a plurality of traffic streams via a shared channel is generally achieved by using a statistical (time division) multiplex. Here the packets in the traffic streams in the transmitter are transmitted interleaved in time according to statistical rules. The rules could for example specify that the packets are to be transmitted in the sequence of their arrival (best effort). If a plurality of packets arrives at the same time, one is transmitted while the remainder are temporarily buffered, resulting in an increase in delay jitter. If more packets than can be buffered arrive at the same time, the surplus packets are discarded. Assignment of the packets to the respective traffic streams is indicated by assignment information in the packet overhead (comprising a header and/or trailer). After joint transmission therefore the packets can be assigned to their associated traffic streams in the receiver. The transmission capacity of the traffic streams is essentially not subject to limitations during packet-oriented transmission but can in principle (in the context of the capacity of the shared channel) have a different value at any time.

In the course of the convergence of line-based voice and packet-oriented data networks, voice transmission services and in future also faster broadband services such as for example the transmission of moving image information (VoD, video conference) will be provided in service-integrated packet-oriented (multimedia) networks—also referred to as voice/data networks, i.e. realtime services until now generally transmitted in a line-based manner are now transmitted in packet streams in a convergent voice/data network. These are also referred to as realtime packet streams. This gives rise to the problem that a high quality of service and security are necessary for the packet-oriented provision of a realtime service to ensure that this is comparable in quality to a line-based transmission, while modern (packet-oriented) data networks and in particular the internet have no adequate mechanisms to guarantee a high quality of service.

Quality of service requirements in service-integrated, packet-oriented networks generally apply to all network types. They are independent of the specific configuration of the packet orientation. The packets can therefore be configured as internet, X.25 or frame relay packets and also as ATM cells. They are sometimes also referred to as messages, particularly when a message is transmitted in a packet. Data packet streams and realtime packet streams are hereby exemplary embodiments of traffic streams transmitted in communication networks. Traffic streams are also referred to as connections, even in packet-oriented networks, in which connectionless transmission technology is deployed. For example information is transmitted with TCP/IP using what are known as flows, by means of which, despite the connectionless nature of IP, transmitter and receiver (e.g. web server and browser) are connected at a logically abstract level, i.e. in a logically abstract way flows also represent connections. It is only essential for a connection that a connection setup takes place before transmission, during which process a context is created which continues to exist at least during transmission. An explicit clear down of the connection can take place after transmission. Implicit mechanisms such as for example timeout of the connection after a specified transmission-free period are however also possible.

The best known data network at present is the internet. The internet is conceived as an open (long-range) data network with open interfaces to connect (usually local and regional) data networks of different manufacturers. The main focus to date has therefore been on the provision of a manufacturer-independent transport platform. Adequate mechanisms for guaranteeing quality of service play a secondary role and therefore barely exist.

The convergence of telecommunication (also known as voice networks) and the conventional data world (also known as data networks) into IP (internet protocol) based networks and services is a difficult task in respect of IP technology, as this is designed as a packet-oriented data network primarily for "best effort" transmission and at best provides for compliance with rather vaguely formulated service level agreements (SLA), while in the case of telecommunication very stringent requirements relating to QoS, reliability, availability and security of network and services play a major role. The internet world responds to this task with a plurality of increasingly complex and expensive solutions but has not as yet found a total solution that is also manageable and workable from an economic point of view.

The QoS requirements of a service or an application in respect of a network can be defined using different criteria, of which some examples are given below:

the throughput characteristics of the digitally coded information, i.e. the necessary bandwidth or bandwidth characteristics (fixed bandwidth, variable bandwidth [e.g. with mean value, peak value, 'burstiness' factor or other characterizing parameters]) and susceptibility to information losses, the delay characteristics, i.e. the effects of an absolute delay (transit time from information source to information sink) and susceptibility to runtime fluctuations or delay jitter (of course delay jitter can be converted to absolute delay by buffering but this is usually very complex), the necessary or unnecessary temporal consistency or time invariance of the transmitted information, i.e. whether the information units have to be delivered in exactly the same sequence in which they arrived or not (in some cases the compatibility or incompatibility of higher service and application layers must also be taken into account).

The consequences of different QoS requirements can be clarified using two examples:

Unidirectional audio/video applications (e.g. streaming video) require realtime presentation at the receiver but in most cases it is immaterial whether the absolute delay is $1/100$, 1 or 5 seconds, as long as there is continuity after the start of playback. Such delay tolerance could for example be used to compensate for information losses using repeats, thereby improving the quality. Alternatively transmission could also take place with redundancy (higher bandwidth) to compensate for possible data losses.

Interactive, i.e. bidirectional realtime communication (voice, video, etc.) between people must take into account the response capability and typical communication and dialog behaviors of people. Here the absolute delay (and therefore of course also the delay jitter) must be limited to a few hundred milliseconds (e.g. 200 ms). On the other hand in some instances somewhat higher loss rates can be tolerated, as the capacity of the human brain to "smooth out irregularities" in speech and visual perception is very well-developed and alertness to minor defects is somewhat reduced in dialog. Realtime dialogs between machines are more complex, however. In this case it may be that attention must be focused on the completeness of the information and on short delays close to the physical limit due to geographical distance (transit time approx. 5 ms per 1000 km distance).

If the QoS specifications are defined and if a network still has reserves in one of these areas, it can deploy these to compensate for deficits in another area. Such compensation can be clarified using two examples:

If an application tolerates relatively high information losses, the delay jitter can be reduced by discarding information units which have been subjected to a high level of delay. Conversely larger delay jitter can of course also be deployed to achieve lower losses, which however results in large buffers.

If the maximum for delay jitter is below the minimum time interval of the incoming information units (known as a 'fast network'), there are no problems with the temporal consistency of the transmitted information. If measures are provided to restore this temporal consistency, relatively large delay jitter can be tolerated as long as the framework of the absolute permissible delay is not exceeded.

As well as QoS the general availability of services is also an important parameter that depends to a large degree on the network and its characteristics. In the event of an error, e.g. in the case of failure of individual network components or connecting lines, is a backup path available and how quickly can it be brought into use? Do interruptions occur that the user can identify and how long do these last? Does the network operator or even the user have to intervene in any way to restore the service in some instances? The reliability of the network in itself and the way in which it can help to bypass errors and where necessary restore the applications is of great significance here.

A standard network must therefore be considered subject to qualification by initial conditions as proposed here and of course it should also be achieved in the most efficient manner possible, i.e. at the lowest possible cost and in an economically advantageous manner.

The known network technologies satisfy the above specification partially at best.

The simplest approach is the tried and tested technology of circuit switching, with which a dedicated connection (in the bidirectional instance or with multiple relations where necessary also two or more connections) (sometimes also referred to casually as a path) with a permanently assigned and absolutely reserved bandwidth is switched for every communication relation. Such connections are either configured explicitly as individual physical lines (e.g. copper wires) or as (virtual) channels in what are known as transmission or switching systems, which allow multiple utilization of physical lines. A mix with differently implemented links is also possible. The possible data throughput of such a connection is determined by its own or its assigned bandwidth, the transport delay time is made up of the propagation delay, i.e. the distance-dependent transit time on the line, and the switching delays, i.e. the inherent processing times resulting during switching of the digitally coded information (data) in the network nodes (switches). Switching here means transferring information (data) from a defined incoming line/channel to an outgoing line/channel specified when the connection is being set up. Both delay components can generally (i.e. when the systems are operating without interference) be assumed to be constant for the period of a communication relation (with through-connected path or existing connection). When there is no interference therefore the same quasi-optimum QoS is predefined and achievable for all applications (no information losses, constant, generally relatively short, delay, no transpositions). However for this the connection must be permanently switched (and reserved) for the duration of the communication relation, even if the application only uses it very infrequently (e.g. only sporadically). Reliability/availability can be improved by switching as quickly as possible to a previously provided alternative connection in the event of an error (double capacity required) or switching the backup connection immediately (delay and expense, particularly when a plurality of connections is affected at the same time by one failure).

Packet switching technology aims at better utilization of resources (bandwidth) by flexible sharing of lines and (where necessary virtual) channels or switching and transmission media by a plurality of communication relations. Known, modern representatives are for example the connection-oriented ATM technology with fixed-length packets (also referred to as cells) and the connectionless IP technology with variable length packets.

ATM technology is also promoted at the ITU-T under this name and with the objective of broadband ISDN (B-ISDN). ATM has mechanisms to provide a broad spectrum of service classes with defined and guaranteed QoS (at the statistical mean), even with very scant resources (available bandwidths). The resulting systems and networks are therefore very complex and expensive. Dimensioning and operation require highly qualified specialist personnel. ATM operates in a connection-oriented manner, with a network of 'virtual' paths and channels, assigned to each other in a hierarchical manner. For a plurality of different service classes bandwidths can be reserved in a connection-specific manner and also 'guaranteed' based on the traffic statistics used as a basis. Different queuing and scheduling mechanisms are used for this and these can be set in every node for each path and channel (connection) by means of appropriate parameters. Fine-granular dimensioning and connection acceptance requirements can be used to limit information losses and the variable parts switching delays (these are essentially determined by queuing) based on statistical rules. Owing to the connection-oriented mode of operation, transposition of information units is unlikely during interference-free operation. As a result of the connection orientation all inherent mechanisms have to be executed again during error handling. The basic concepts are therefore often very similar to those of circuit switching technology.

IP technology is more of a pragmatic approach that has become established in the data world due to its simple basic mechanisms. It has made massive progress in recent years so that the capacity (data throughput, control efficiency) of systems and networks based on it is comparable to that of systems based on ATM technology. The success of IP technology is significantly due to the fact that a large part of the services and applications are already based on packet-oriented internet protocols (IP) in the terminal. It is currently predicted that the growth in IP-based services will also be significantly greater in the future than in other technologies, so an extensive migration of all services to transport via IP-based networks seems probable. Unlike ATM networks IP networks operate in a connectionless manner and only provide a 'best effort' service, with which it is difficult to predict and impossible to guarantee an achievable QoS even with generously dimensioned networks.

The following solutions were also known to date:

a) Using an ATM network as a core network. Edge devices transfer the IP data streams to ATM connections of appropriate service classes and transport takes place in corresponding connections in the ATM network. Problems here are scalability, complexity and setting up and operating costs (see ATM technology above). This solution is of more assistance in the core. The same disadvantages apply to (additional) use in the access. The following solution is an alternative in the access.

b) Using a signaling protocol and setting up connections with reserved bandwidths via the IP network (integrated services—IntServ, RSVP). This solution is feasible in principle both end-to-end (E2E), i.e. from terminal to terminal, and on subsections. It can be used for each communication flow or (in the core) also for aggregated communication flows. It is however elaborate, expensive, non-scaling (control costs) and inefficient, i.e. very similar to ATM technology.

c) MPLS: This approach is based on ATM technology. Paths (connections) are set up in the network, via which the traffic of individual (generally aggregated) flows is specifically routed. It is frequently proposed for QoS in conjunction with RSVP and DiffServ (see below under d)) and can also be provided based on ATM transport. It reverts to the complexity of connection-oriented mechanisms with all the consequences already set out (from bandwidth control to monitoring the existence of the connection), i.e. it is of similar complexity to ATM technology. In conjunction with the DiffServ solution it should in particular alleviate the problem discussed there (specific traffic control via paths).

d) Differentiated Services (DiffServ): The data packets are classified and marked in the edge device on the basis of their association with specific services, applications or communication relations, etc. (Flow-related) access control and monitoring (e.g. for availability of resources and compliance with the specified bandwidth and QoS characteristics) can and should also take place. The packets then follow the route through the network predefined by their packet header information (e.g. destination address) and the routing protocols, whereby they are processed (or prioritized) in every node according to their marking with appropriate 'per hop' behavior. The DiffServ approach allows the freedom of per hop behavior within a single routing domain, e.g. the (sub) network of an operator, but requires complete edge processing between such domains (subnetworks). The DiffServ approach cannot prevent temporary and/or local bottlenecks, as there is generally no consideration of or harmonization with the routes predefined by the routing protocols. Generally packets with the same destination follow the same set route from the point when they meet in a node. This can result significantly in skewed loads and bottlenecks in the networks with correspondingly long (queuing) delays or even packet losses. Network and route engineering is also a complex task, whereby the aspects of reliability and availability (e.g. rerouting in the event of error) are a further complication.

In principle almost all combinations of said approaches are conceivable and have to a large extent also been discussed. All these approaches have in common the fact that (with the exception of DiffServ) they are based on paths and use bandwidths and where necessary further resources reserved along said paths. Even a purely DiffServ approach is always based at least on routes predefined by routing protocols. This is generally associated with a major administrative burden with regard to preparing and (statically) setting up paths and routes in the network or a correspondingly high control burden for the dynamic selection and switching of the routes. Also storage devices must be kept available in every network node to hold path-specific and connection-specific information, which can be lost or have to be reconfigured on other routes in the event of error. Even with the purely DiffServ approach the traffic follows the routes predefined by the routing protocols and these therefore have to be very carefully dimensioned and monitored. Generally however it is not possible to predict exactly either all fluctuations in traffic volume or the responses of the routing protocols to possible events in the network.

SUMMARY OF INVENTION

One object of the invention is therefore to highlight a way in which services which comply reliably and efficiently with their specific QoS requirements can be provided simply, pragmatically and economically in a service-integrated, packet-oriented and in particular IP-based network.

This object is achieved by the subjects claimed. Extensive traffic distribution in the network is proposed. Among other things it achieves an optimally balanced QoS with best effort character for all services and applications. Traffic distribution according to the invention also allows the step beyond a single routing domain to a comprehensive total solution.

One important aspect of the invention is the departure from conventional, established ways of thinking, for example by challenging the subjectivity of characteristics such as QoS and reliability and no longer associating them with just one path or route but defining them as overall characteristics of the network solution, which thereby increases in autonomy and is also more economical to operate. Consider ing QoS at network level QoS first allows it to be represented in connectionless operation. Such consideration according to the invention is based for example on the following deliberations:

Quality of service (QoS) is a relative concept. Even when information is transmitted with circuit-switched technology, data loss cannot be excluded (e.g. due to failure (->bit error) or frame slippage). Such weaknesses can however either be tolerated (e.g. in digital telephony) or they are compensated for by appropriate protection measures in the same (e.g. by means of redundancy) or higher layers (e.g. by repetition) (data technology). Finally, the (subjective) QoS perception of the recipient of the information decides. Realtime, interactive communication involving people for example always takes place via their sense organs (operating in an analog manner) which can handle incomplete information (otherwise (in particular mobile) telephone calls, film, and television as they operate at present would definitely not be possible). The requirements for the interactive control of machines (e.g. remote control of robots) are in some instances significantly more demanding so that a more detailed consideration of each individual case may be necessary. However under no circumstances it is possible to go below the physical limits, e.g. with regard to distance-dependent propagation delays.

QoS therefore does not necessarily require an absolute guarantee (this does not in any case exist, even using paths and reservations) but compliance with the corresponding specific requirements for the respective service from the point of view of the recipient of the information. In the case of packet-oriented transmission this primarily concerns the nature and scope of possible information losses, fixed and/or variable delays and the temporal consistency (sequence) of the information. ATM technology for example is based on switching nodes and transmission routes dimensioned according to the rules of statistics and the principle of connection-oriented transmission with correspondingly reserved resources along the path, whereby the correct distribution of resources along the paths is ensured by powerful but therefore also complex queuing and scheduling mechanisms in the network nodes.

Modern high-speed (data) networks operate at wire speed. IP-based networks such as the internet first see only packets and process all of these in the same manner a priori in that the first packet to arrive is also the first to be forwarded; if the re are not sufficient transmission resources available, the packets are first stored (queuing, buffer) and if there is no more storage space available, surplus incoming packets are discarded (best effort principle). The network nodes in these networks, known as routers, were originally computers, i.e. the complete functionality of analyzing and forwarding the data packets was implemented in software programs. Accordingly until recently such networks were also comparatively slow. However with the assistance of correspondingly dimensioned buffers and appropriate data protection mechanisms in the higher protocol layers such as for example TCP, it was possible (although frequently with long delays) to achieve a sufficiently reliable and workable transmission of non-time-critical information.

Technological progress allowed the implementation of elementary router functions in hardware (ASICS, FPGAs), thereby opening up the route to fast and therefore also quasi-realtime forwarding of data packets on higher-speed connecting lines. Practically the only remaining delaying element is then the unavoidable buffering to resolve conflicts in the event of the simultaneous arrival of a plurality of data packets routed to the same egress. These delays however become increasingly less significant with increasing bandwidth (or better: speed) of the connecting lines between the routers, because then the waiting times caused by conflicts become increasingly shorter due to the faster outflow of data packets. This is particularly the case when different traffic streams can be differentiated by appropriate marking and can be processed differently during queuing and scheduling (DiffServ, prioritization).

c) Despite this technological progress, important aspects of relevance to the service remain unaffected, such as:

the aggregation of traffic streams on the routes in the network, with the result that even with careful control of the traffic streams at the network inputs, further into the network skewed loads, which in some instances adversely affect the QoS, cannot be predicted and therefore cannot be prevented either, or the immense complexity and resulting long time required to reconfigure the routes in the event of error, as a result of which the availability of network and services can be significantly restricted for the user.

A communication network according to the invention, according to this new inventive consideration, comprises the following characteristics and functionalities (basic concept):

it operates in a packet-oriented and connectionless manner, it offers a plurality of input and output ports, it comprises a plurality of network nodes which are intermeshed so that there is (generally) a plurality of paths between different input and output ports, it contains mechanisms that strive all the time (i.e. where possible at every decision point in the network) to achieve the most regular distribution possible of the traffic load in the network taking into account the respective destination (output port) of the data packets.

The disadvantages mentioned above of existing network technologies resulting during their deployment as a service-integrated, packet-oriented network, are therefore largely eliminated, as required, and the desired economic advantages are achieved at the same time:

The network should be connectionless and packet-oriented. An IP-based network in particular can therefore be deployed, as this satisfies the specified requirements.

Uniform traffic distribution allows optimum use of resources with maximum quality and therefore the most economical dimensioning. This achieves a low-cost total solution.

A network operated in a connectionless manner requires no control power for connection setup and cleardown, no route selection, no route reconfiguration, no path recovery in the event of error, etc. It is therefore simple to control and economic to operate, as very little administrative intervention is required and the network is almost self-organizing.

The aggregation of traffic streams with the same destination is avoided by definition as a result of distribution, because even aggregated traffic streams are redistributed to different lines in the network during the course of their further transmission.

In the event of an error, i.e. failure of an outgoing line, complex reconfiguration of the traffic streams affected by the failure to backup routes is not required. Instead it is sufficient no longer to distribute the traffic streams to the failed line. To eliminate the error it is therefore only necessary to reduce the degree of distribution. There is no need for reconfiguration.

Finally the overall effect of the solution is clearly pragmatic, as the fact that there is no need for complex reconfiguration and prioritization mechanisms significantly reduces the configuration effort for network management.

Further features can be included in different embodiments and configurations. Some features and feature combinations associated with particularly desirable advantages are set out below, together with some possible alternative solutions:

The object of traffic distribution is to achieve the most uniform distribution possible of the traffic load in the network. It can take place in different granularities, e.g. based on aggregated traffic streams, for each individual traffic stream or based on individual data packets. Distribution becomes all the more efficient, the finer the granularity. The distribution decision should be taken automatically on an ad hoc basis in every network node. The decision criterion used is the information delivered with the data packets, e.g. a combination of source and destination addresses, in some cases also with further information, which is used for example for assignment to a specific traffic stream. In the case of distribution based on traffic streams, all the data packets that belong to the same traffic stream generally take the same route through the network. The quality-enhancing effect of traffic distribution, by reliably preventing skewed loads and even the overloading of individual network sections, is hereby achieved primarily with an adequate statistical mass or traffic streams of the same type (in particular with similar bandwidths).

In the case of a predefined network topology with (theoretically) regular linking/intermeshing (see FIG. 1), route information for traffic distribution and resulting 'branch patterns' can be preset to a more or less permanent extent in the network nodes.

In a real, evolved data network (see FIG. 3) intermeshing is generally irregular and rather incomplete. Also changes repeatedly occur in the network configuration or network topology during operation. According to the invention a flexible update of the possible routes and branch patterns takes place for this purpose (as required or at regular intervals) and/or the node derives new branch patterns from changed route information. Corresponding protocols from the internet environment (routing protocols such as OSPF, BGP) or variants/developments derived from these are possible mechanisms for the distribution of route information. Of course this information can also be predefined via a network controller (of any type) or a network management system.

In the case of the branch patterns further criteria, such as different bandwidths, different distance from destination, route costs, etc. can also be included in the algorithms for specific route selection. This means for example that in the case of packet distribution between an STM-4 and an STM-1 link corresponding weighting can be used to ensure that only every $5^{th}$ packet is passed to the STM-1 link. The load can be distributed more precisely when individual packet lengths are also taken into account. Weighting the links according to appropriate criteria is also advantageous, in order to prevent the formation of route loops in a network with complex intermeshing or for example to limit packet delay jitter. Different packet delays on different routes can result in a change in the packet sequence. This is restored at the network egress (resequencing), e.g. if an application should require this.

The best effort character of the inventive traffic distribution, with which services and applications are adversely affected by an increasing load (more or less tangibly depending on their characteristics and requirements), can be significantly improved if the overall traffic load in the network is limited on the basis of the actual network capacity.

On the one hand the bandwidth of the individual network access points both on the ingress side and the egress side could also be considered and be taken into account both separately and as part of the overall picture. Based on the statistical traffic characteristics of the different services and applications and based on the topology of the network and the capacity and performance of the network nodes and connecting lines and assuming specific response patterns on the part of the subscriber or specific traffic characteristics resulting from these at the network access points, the network is dimensioned so that specific factors determining the QoS limit values, such as packet loss rate, packet delay or delay jitter, are only exceeded under such initial conditions with an easily definable, sufficiently small statistic probability.

On the other hand the traffic in a given network could be limited to comply with the corresponding boundary conditions. For this all communication relations and data streams in the network are parameterized appropriately, registered individually whenever they occur and admitted or rejected as a function of the current load situation in the network (admission control).

Both mechanisms are in themselves however neither practical nor economical. Therefore for example overdimensioning of the networks to comply with the requirements of more susceptible services is not economically justifiable in respect of less susceptible services, nor is admission control practical for the majority of the traditional and also future internet applications designed for a best effort environment.

A differentiated QoS that is tailored to the requirements of the respective service will result according to the invention from a differentiation and classification into different traffic classes which are processed and in particular prioritized in a correspondingly different manner. The number of traffic classes is at least two. Strict prioritization is preferred for processing in the network nodes (i.e. at the queuing points), as alternative methods (e.g. Weighted Fair Queuing WFQ) which also guarantee resources for lower priority traffic classes in all circumstances generally impair the higher priority traffic in the case of a heavy load and are by nature significantly more complex than strict prioritization, with which no lower priority traffic is transmitted while high priority traffic is waiting for transmission.

In a communication network of the type mentioned above the feature of prioritization can have the following advantageous applications and embodiments: All data streams are classified in corresponding priority classes according to their requirements. The lowest class is taken into account during network dimensioning (in the context of expected overall traffic volume) and essentially processed according to the best effort principle. For all communication relations or data streams in higher priority classes an admission control is carried out at the network ingress (in the input direction) and at the network egress (in the output direction). For this these data streams are registered at these two points with corresponding parameters (e.g. mean data and/or packet rate, peak rate, etc.) and evaluated. The decisions at the ingress and egress are independent of each other and only if both decisions are positive is the data stream admitted. The decision criterion used can for example be a threshold value that is determined as a function of the port capacity, the overall network capacity, the required quality in respect of possible packet delays and losses, etc., the respective priority class and if necessary further criteria. It is also possible that there could be a plurality of threshold values for each class based on different evaluation parameters, all of which have to be complied with individually or in a corresponding relationship with each other.

The admission control on the one hand limits the overall traffic volume of a specific priority class in the network and on the other hand it also restricts the associated traffic volume at each individual input and output port. The regular distribution of the traffic in the network (ideally packet-based) and the correspondingly preferred processing mean that this traffic will always find adequate resources (free link capacity, buffers) in the network when the thresholds are set correctly, in order to comply with the limit values for both delay and loss in its quality requirements. The network can thereby be fully utilized and economically operated, because all the bandwidth not used by high priority traffic can be used at any time by low priority traffic.

Ideally preferred processing is achieved by strict priority, i.e. where necessary total displacement of low priority traffic. Strict priority means minimum delay and minimum loss. Also it is clearly a simpler priority mechanism than for example the Weighted Fair Queuing method known from the prior art.

Compliance with the registered traffic parameters by the individual data streams is monitored, because in the context of traffic distribution even a single data stream "going haywire" can significantly interfere with all the traffic throughout the network. The monitoring function (traffic enforcement, policing) can advantageously be designed to be relatively permissive and therefore economical, because a random, short-lived, minor violation is compensated for correspondingly by the traffic distribution according to the invention.

The monitoring function is advantageously applied to the individual data streams as they are registered. Alternatively any type of aggregation can be provided for each port, with which only an overall limit is verified and intervention takes place in response to violation of the overall limit within an aggregate randomly and where necessary through all the data streams contained there. Any and of course all relevant known mechanisms (e.g. leaky bucket) can in principle be used and the same also applies to the response options (discarding of packets, marking of packets, disconnection/blocking of data streams, etc.). In some instances marking can also involve the transfer of the packets infringing the agreement (or even better the entire associated data stream) to a lower or the best effort class.

The principle of traffic distribution (in particular when this takes place at packet level) can also be deployed very advantageously to improve network and service reliability and availability. For this it is sufficient for the network nodes, when they identify an error (e.g. failed link, failed adjacent node) to remove the associated link(s) from the branch fan and continue distribution via the remaining links only. The decision can be made immediately and autonomously on independent identification of error status and on external identification subject to availability of information. If the network is adequately dimensioned, such a response results at worst in somewhat more displacement of best effort traffic but to no impairment of the quality of the high priority traffic. This particularly desirable advantage is clearly achieved with the inventive combination in a very simple, pragmatic and economical manner, as comparatively simple mechanisms are deployed compared with the prior art described above.

One very interesting variant of the basic concept results when the method for traffic distribution is only applied to the higher priority traffic class(es). The best effort traffic selects its routes based on the current internet principles, while the higher priority traffic is distributed uniformly in the network and fills it from the bottom up, so to speak. The best effort traffic therefore can be said to swim on a moderately full sea of higher priority traffic and is increasingly displaced as the 'tide' rises. One attractive advantage of this variant is that the QoS solution can be added on to available networks, while the existing mechanisms continue unchanged.

The proposed principle can also be applied in a cell-based network, e.g. an ATM network.

The reliability of the network is further improved by automatic monitoring mechanisms in the router, particularly in the context of the distribution method.

To increase reliability over the entire network as an option a type of fast feedback mechanism can be deployed between the routers, which makes it possible for example to distribute the traffic differently further upstream in good time when problems occur somewhere further downstream.

Admission control is where necessary configured so that it automatically offers the user the next class down when a high priority traffic class is 'overbooked'.

The resequencing function is generally provided at the network egress, e.g. as a standard function. Advantageously all current TCP applications, in which the resequencing function is generally not implemented, can therefore continue to be used unchanged.

BRIEF DESCRIPTION OF THE DRAWINGS

The invention is described in more detail below with reference to further exemplary embodiments shown in the figures, in which.

DETAILED DESCRIPTION OF INVENTION

In the figures those transmission edges along which traffic streams are transmitted in a distributed manner in each instance are marked in each case by an arrowhead, which also points in the direction of transmission.

One embodiment of the invention provides a connectionless, packet-oriented communication network,
  with at least two different traffic classes, of which one is processed purely as best effort traffic, while the at least one other is strictly prioritized in respect of it (and in the case of a plurality of others, preferably also in respect of each other),
  with network nodes, from which the traffic is distributed individually and autonomously with the objective of uniform traffic load distribution preferably in a packet-based manner according to specific rules to all or at least a plurality of paths in the direction of their destination (network egress),
  in which the network nodes exchange/disseminate the information about available routes by means of corresponding protocols, in which the network nodes adjust their (traffic) distribution patterns immediately and autonomously in the event of an error,
  that undertakes an admission control based on specific traffic parameters for the data streams of the at least one higher traffic class preferably at every ingress and egress (said admission control for example no longer admitting further traffic of said traffic class(es) from a total load reached of x % (x %, (x+d)%, (x+nd)%) of port capacity),
  that only accepts a data stream of the at least one higher traffic class if both admission controls (at the input port and at the output port—independently!) have made a positive decision,
  that monitors the registered traffic parameters of the data streams of the higher traffic class(es) at each ingress and where necessary intervenes with appropriate measures, and
  that provides a resequencing function at every egress for optional use by (all) the data streams.

Figure 1:
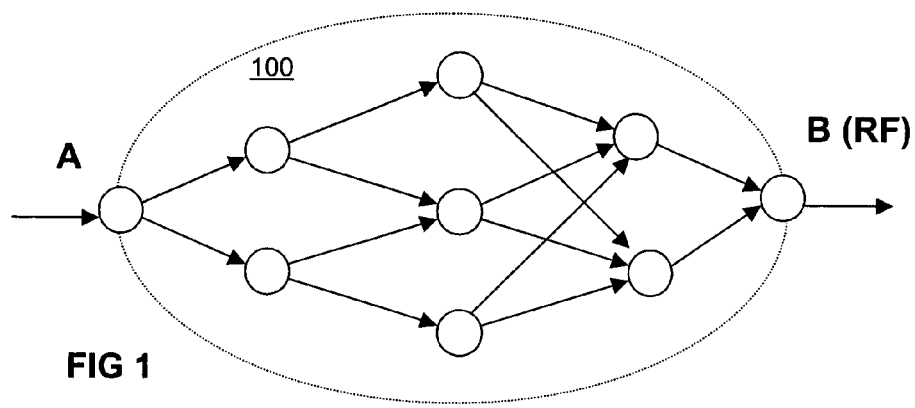
FIG. 1 shows an arrangement for implementing the method according to the invention which is configured as an exemplary network to illustrate the basic principle for traffic distribution in a network that is meshed regularly over different stages (network levels)

A further embodiment of the invention is shown in the communication network shown in FIG. 1. With the network 100 at least one traffic stream is transmitted in a distributed manner from a transmission node A configured as an ingress node to a transmission node B configured as an egress node. The distributed transmission thereby takes place in the network 100 in such a way that the part of the traffic stream(s) received in each instance is transmitted from most of the transmission nodes of the network 100 to precisely two subsequent transmission nodes in a distributed manner. Only the two transmission nodes arranged immediately before the egress node B transmit directly to the egress node B in the absence of alternative residual routes without network-wide distribution, so that the parts transmitted in a distributed manner can be merged in this back into the original traffic streams. At the egress node B the distributed traffic streams arrive in the present instance from two different directions. The received parts of the traffic streams are preferably resequenced into their original sequence at the egress node by means of an assigned resequencing function RF. This means that traffic streams can also be transmitted in the network 100 between applications which are dependent on transmission maintaining the original sequence before transmission, without requiring a change and/or modification of the applications.

Figure 2:
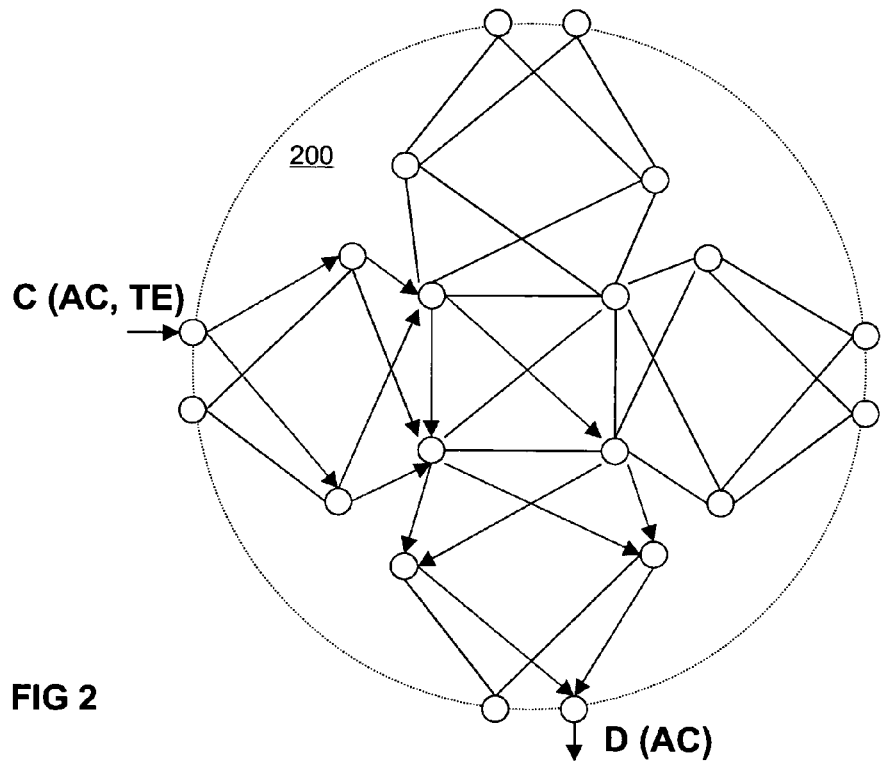
FIG. 2 shows an arrangement for implementing the method according to the invention which is configured as one of a plurality of possible specific embodiments of the invention.

FIG. 2 shows an alternative embodiment of the invention configured as a communication network 200. With the network 200 at least one traffic stream is transmitted in a distributed manner from a transmission node C configured as an ingress node to a transmission node D configured as an egress node. Unlike the network 100 only some of the transmission edges of the network 200 are used for distributed transmission between the two nodes C and D. This is based on the fact that in the network 200 not just any route is used for distributed transmission from the node C to the node D but only those routes that are particularly suitable for this purpose. In the present example these are those routes which, taking into account the topology of the network 200, do not take too great a detour through the network 200 and therefore are all subject to a transmission delay, which is preferably within a relatively small, predefined tolerance range. Routes which lead from the node C to the node D, but the transmission delay of which deviates too greatly from the tolerance range, are not suitable for this exemplary distributed transmission.

The traffic streams are preferably transmitted in a packet-based manner in every transmission node between the nodes C and D to the respective subsequent nodes. Also distribution is carried out taking into account utilization of the respectively remaining residual routes and/or the length of the packets transmitted respectively to the residual routes. This results in a largely uniformly distributed transmission between the nodes C and D. If this principle is applied between all the ingress and egress nodes of the network 200, the network 200 is filled from the bottom up with a basic stock of distributed traffic, whereby utilization of the transmission nodes and transmission edges for the entire network 200 is similar. No part of the network 200 remains in overload for a longer period compared with the remainder of the network 200.

If the incoming traffic is divided in the network 200 into two traffic classes, the higher priority traffic is transmitted in a preferred and distributed manner and the volume of the higher priority traffic is limited by means of admission controls AC and traffic monitoring TE, the higher priority traffic can be transmitted in the network 200 almost with realtime character. Best effort character is achieved for the lower priority traffic, whereby its quality decreases as the higher priority traffic increases and vice versa. Strict prioritization is totally adequate for prioritizing the traffic. Compared with other known prioritization mechanisms this is characterized by its particular simplicity, as a result of which from an economic point of view it can be set up particularly advantageous ly in the transmission nodes.

Figure 3:
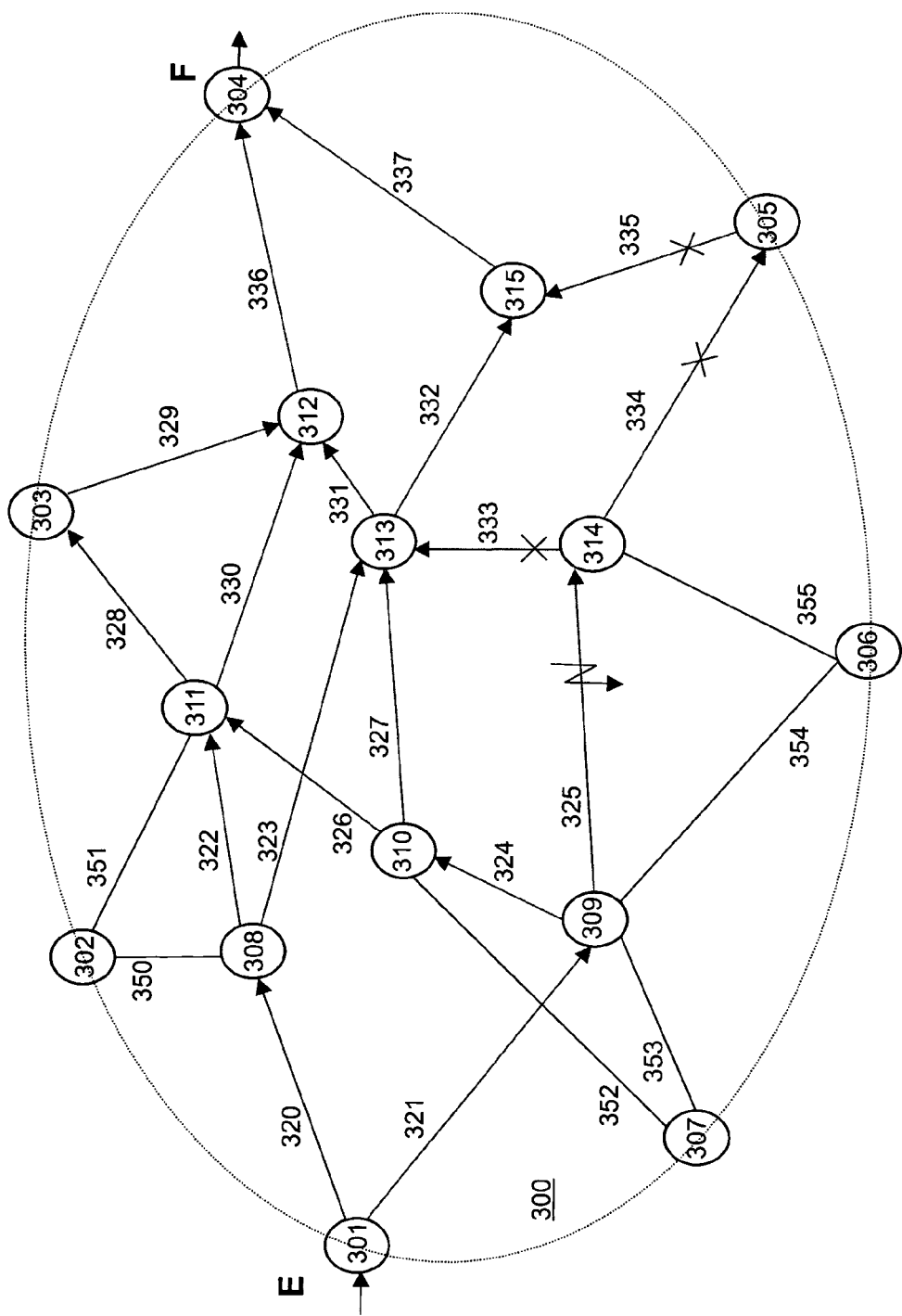
FIG. 3 shows an arrangement for implementing the method according to the invention which is configured as a real, evolved (data) network with irregular and rather incomplete meshing.
Figure 4A:
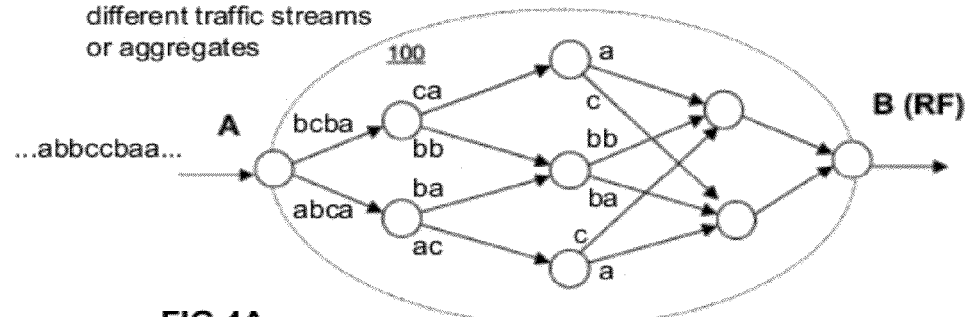
FIG. 4A shows an example of a possible distribution of a sequence of packets belonging to three different traffic streams or aggregates to be transmitted between ingress A and egress B based on traffic distribution decisions taken in the network nodes for each individual packet with no priorities applied.
Figure 4B:
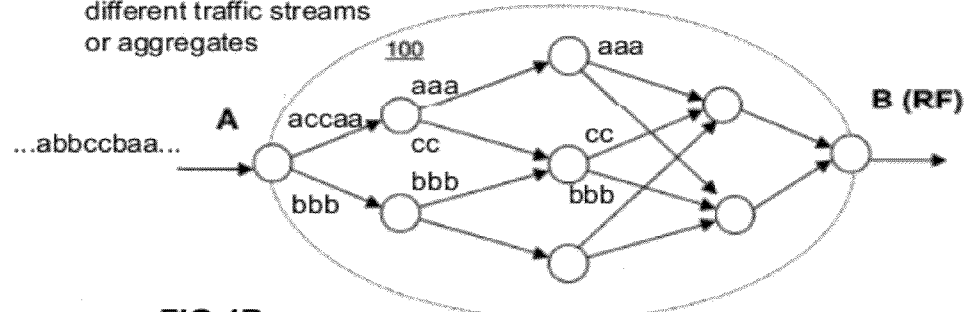
FIG. 4B shows an example of a possible distribution of a sequence of packets belonging to the same different traffic streams or aggregates as in FIG. 4A, when the traffic distribution decisions in the network nodes are taken for the first packet of a traffic stream only and all packets that belong to the same traffic stream take the same route through the network, again with no priorities applied.
Figure 4C:
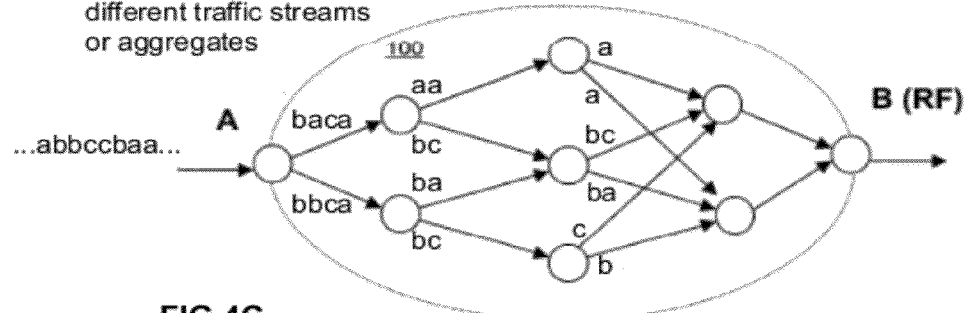
FIG. 4C shows an example of a possible distribution of a sequence of packets belonging to three different traffic streams or aggregates according to FIG. 4A, when the traffic streams a and c are strictly prioritized against stream b in the network nodes.
Figure 5:
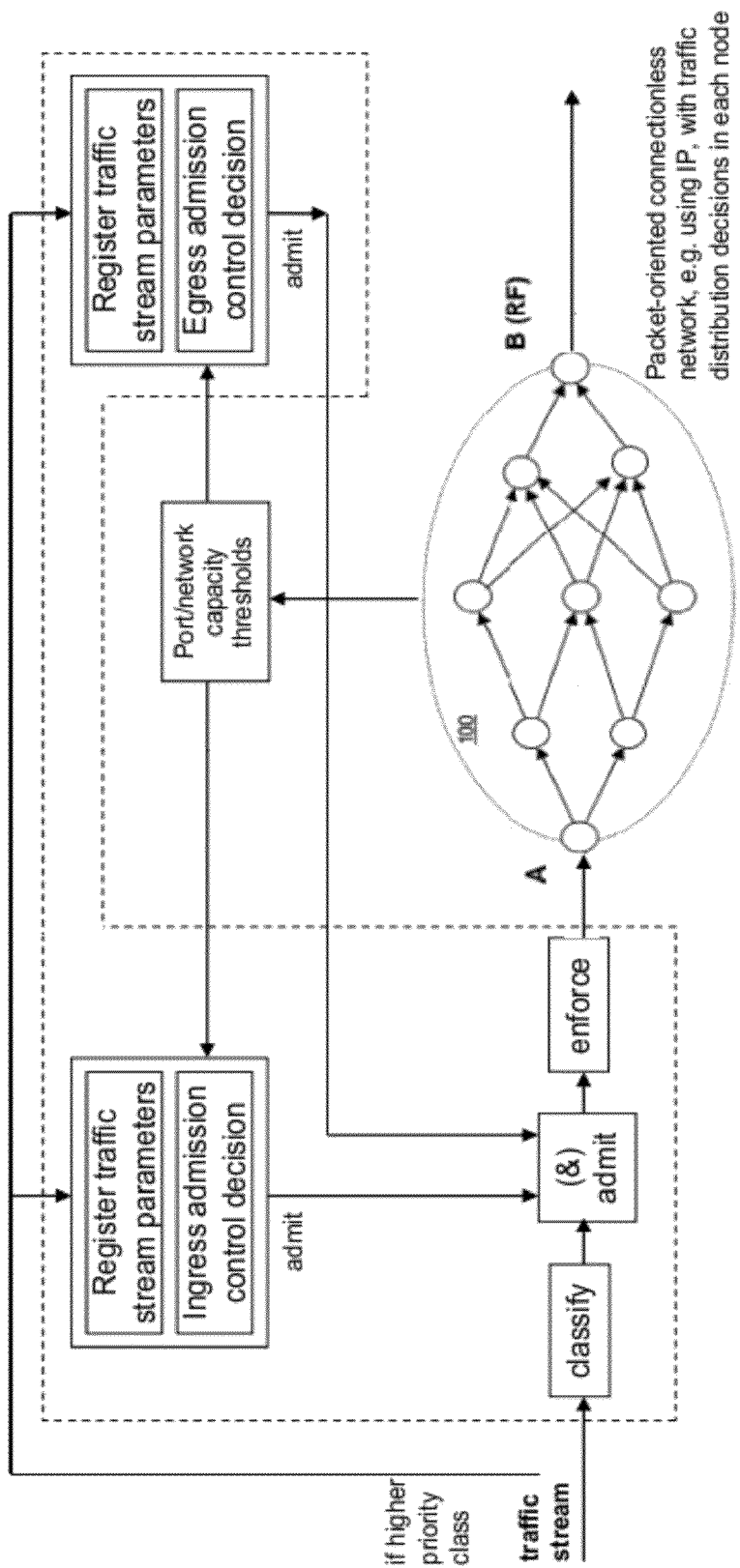
FIG. 5 shows an example of a possible embodiment of a packet-oriented connectionless network incorporating traffic distribution and the ingress and egress functions and mechanisms as disclosed with this invention.

Further aspects of the invention are shown in the communication network 300 according to FIG. 3. The network 300 comprises a plurality of transmission nodes 301-315, whereby the transmission nodes 301-307 are configured as ingress and/or egress nodes. At least one traffic stream is transmitted in a distributed manner as follows from the transmission node E configured at least as the ingress node 301 to the transmission node F configured at least as the egress node 304:

| From node | Via edge | To node |
|---|---|---|
| 301 | 320 | 308 |
|  | 321 | 309 |
| 308 | 322 | 311 |
|  | 323 | 313 |
| 309 | 324 | 310 |
|  | 325 | 314 |
| 311 | 327 | 303 |
|  | 329 | 312 |
| 313 | 330 | 312 |
|  | 331 | 315 |
| 310 | 326 | 311 |
|  | 327 | 313 |
| 314 | 333 | 313 |
|  | 334 | 305 |
| 303 | 329 | 312 |
| 305 | 335 | 315 |
| 312 | 336 | 304 |
| 315 | 337 | 304 |

It can clearly be identified that from every transmission node between the nodes E and F, from which more than one residual route extends to the egress node F, the traffic sent to said transmission node is transmitted distributed to at least two residual routes.

FIG. 3 also shows how the branch pattern changes when the transmission edge 325 fails. As a consequence in the predecessor node 309 the transmission edge 325 is deleted from the branch fan stored for transmission in the direction of the egress node F. No more traffic is then sent to the transmission nodes 314 and 305 located after the transmission edge 325. The transmission nodes 313, 312 and 315 also located after it however continue to receive traffic, which is transmitted distributed to other routes of the branch pattern not including the failed transmission edge 325. On failure of the transmission edge 325 the above branch pattern changes as follows:

| From node | Via edge | To node |
|---|---|---|
| 301 | 320 | 308 |
|  | 321 | 309 |
| 308 | 322 | 311 |
|  | 323 | 313 |
| 309 | 324 | 310 |
|  | ~~325~~ | ~~314~~ |
| 311 | 327 | 303 |
|  | 329 | 312 |
| 313 | 330 | 312 |
|  | 331 | 315 |
| 310 | 326 | 311 |
|  | 327 | 313 |
| ~~314~~ | ~~333~~ | ~~313~~ |
|  | ~~334~~ | ~~305~~ |
| 303 | 329 | 312 |
| ~~305~~ | ~~335~~ | ~~315~~ |
| 312 | 336 | 304 |
| 315 | 337 | 304 |

It can clearly be identified that the failure of the transmission edge 325 only results in a thinning out of the branch pattern and does not require reconfiguration of the network 300. In particular the egress node F is still accessed via two routes. It is clear that the invention is extremely resistant in a highly pragmatic manner to failures of transmission nodes or transmission edges. The higher the degree of meshing of the communication network, the more routes there are between the ingress and egress nodes, so that even if the majority of the network fails, in most cases at least one route still remains, on which traffic streams can continue to be transmitted. Total interruption only occurs if the communication network more or less totally fails. In this case however even the complex reconfiguration of the routes known from the prior art would be of little assistance. It would be possible at most if in normal operation routes classed as unsuitable were still functional. In this case reconfiguration of the still functional transmission nodes to new, less optimum branch patterns would be possible in the event of at least partial failure of the existing branch patterns. The transmissions interrupted as a result of the failure can then be resumed after reconfiguration if alternative routes have been found.

It should be pointed out that the description of the components of the standard communication network of relevance to the invention should in principle not be seen as restrictive. It is clear in particular to a person skilled in the relevant art that the terms used should be understood functionally and not physically. As a result the components can also be provided partially or wholly in software and/or distributed over a plurality of physical devices.

The invention claimed is:
1. A method for providing services which comply reliably and efficiently with their specific QoS requirements in a broadband, service-integrated communication network by transmitting traffic streams resulting from use of the services by means of a packet-oriented transport mechanism, the network offering a plurality of input and output ports and comprising a plurality of network nodes which are intermeshed so that there is generally a plurality of paths between different input and output ports, the method comprising:

operating the network in a packet oriented and connectionless manner;

distributing the traffic in the network to achieve a substantially uniform distribution of the traffic load in the network with traffic distribution decisions being taken automatically on an ad hoc basis in each network node;

classifying each traffic stream according to its requirements into one of at least two traffic classes, which are processed and prioritized in a different manner for achieving a differentiated QoS tailored to the requirements of the respective service;

for each traffic stream in higher priority classes except for the lowest class carrying out an admission control at the network ingress and at the network egress; and admitting the traffic stream for transmission only if both admission control decisions for the traffic stream taken independently of each other are positive.

2. The method according to claim 1, wherein the packet-oriented and connectionless operation of the network uses the Internet Protocol (IP).

3. The method according to claim 1, wherein the traffic distribution decisions in the network nodes are taken for each individual packet.

4. The method according to claim 1, wherein the traffic distribution decisions in the network nodes are taken for the first packet of a traffic stream only and all packets that belong to the same traffic stream take the same route through the network.

5. The method according to claim 4, wherein the traffic stream considered represents an aggregate of a multiplicity of other traffic streams.

6. The method according to claim 1, wherein the traffic classes are strictly prioritized against each other for processing in the network nodes.

7. The method according to claim 1, wherein for carrying out the admission control the traffic streams are registered at the network ingress and at the network egress with corresponding parameters.

8. The method according to claim 1, wherein the admission control decisions are effected against threshold values determined as a function of port and/or network related capacities.

9. The method according to claim 7, wherein compliance with the registered traffic parameters by the individual traffic streams is monitored by a traffic enforcement or policing function.

* * * * *